(12) United States Patent
Wei et al.

(10) Patent No.: US 7,813,740 B2
(45) Date of Patent: Oct. 12, 2010

(54) METHOD AND APPARATUS FOR MANAGING IMBALANCE IN A COMMUNICATION SYSTEM

(75) Inventors: Yongbin Wei, San Diego, CA (US); Edward G. Tiedemann, Jr., Concord, MA (US); Stein A. Lundby, Solona Beach, CA (US); Tao Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1440 days.

(21) Appl. No.: 10/272,135

(22) Filed: Oct. 15, 2002

(65) Prior Publication Data

US 2003/0072294 A1 Apr. 17, 2003

Related U.S. Application Data

(60) Provisional application No. 60/329,772, filed on Oct. 15, 2001.

(51) Int. Cl.
*H04Q 7/20* (2006.01)
*H04B 7/00* (2006.01)
*H04M 1/00* (2006.01)

(52) U.S. Cl. .................. 455/453; 455/442; 455/524; 455/552.1

(58) Field of Classification Search .......... 455/453, 455/522, 69, 127.1, 437, 439, 442, 436, 438, 455/524, 525, 444; 370/345
See application file for complete search history.

(56) References Cited

U.S. PATENT DOCUMENTS

| 4,901,307 | A |   | 2/1990  | Gilhousen et al. |            |
|-----------|---|---|---------|------------------|------------|
| 5,056,109 | A |   | 10/1991 | Gilhousen et al. |            |
| 5,103,459 | A |   | 4/1992  | Gilhousen et al. |            |
| 5,267,261 | A |   | 11/1993 | Blakeney, II et al. |         |
| 5,504,773 | A |   | 4/1996  | Padovani et al.  |            |
| 5,584,049 | A | * | 12/1996 | Weaver et al.    | 455/67.11  |
| 5,625,876 | A |   | 4/1997  | Gilhousen et al. |            |
| 5,796,722 | A | * | 8/1998  | Kotzin et al.    | 370/252    |
| 5,812,540 | A | * | 9/1998  | Bruckert et al.  | 370/332    |
| 5,933,462 | A |   | 8/1999  | Viterbi et al.   |            |
| 5,933,787 | A |   | 8/1999  | Gilhousen et al. |            |
| 5,940,430 | A |   | 8/1999  | Love et al.      |            |
| 5,987,326 | A | * | 11/1999 | Tiedemann et al. | 455/442    |
| 6,014,567 | A | * | 1/2000  | Budka            | 455/453    |

(Continued)

FOREIGN PATENT DOCUMENTS

EP        0809365        11/1997

(Continued)

OTHER PUBLICATIONS

International Search Report-PCT/US02/033048, International Search Authority-European Patent Office-May 16, 2003.

(Continued)

*Primary Examiner*—Tilahun Gesesse
(74) *Attorney, Agent, or Firm*—Rupit M. Patel

(57) ABSTRACT

Method and apparatus for managing imbalance in a wireless communication system, thus reducing the impact of unreliable reverse link on the wireless communication system's stability, capacity, and data traffic throughput are disclosed.

23 Claims, 2 Drawing Sheets

U.S. PATENT DOCUMENTS

| | | | |
|---|---|---|---|
| 6,134,444 A * | 10/2000 | Kotzin | 455/453 |
| 6,205,129 B1 | 3/2001 | Esteves et al. | |
| 6,229,795 B1 | 5/2001 | Pankaj et al. | |
| 6,515,975 B1 * | 2/2003 | Chheda et al. | 370/332 |
| 6,574,211 B2 | 6/2003 | Padovani et al. | |
| 6,574,477 B1 * | 6/2003 | Rathunde | 455/453 |
| 6,785,249 B2 * | 8/2004 | Soliman | 370/335 |
| 6,950,417 B2 * | 9/2005 | Soliman | 370/335 |
| 7,054,632 B2 * | 5/2006 | Attar et al. | 455/436 |
| 7,292,856 B2 * | 11/2007 | Julian et al. | 455/436 |
| 2002/0111169 A1 * | 8/2002 | Vanghi | 455/436 |

FOREIGN PATENT DOCUMENTS

EP             1047207           10/2000

OTHER PUBLICATIONS

Tao Chen, "Method and Apparatus for Improved Forward Link Power Control While in Soft Handoff", U.S. Appl. No. 09/587,668, Jun. 5, 2000.

Written Opinon-PCT/US02/033048, International Search Authority-IPEA/US-Aug. 17, 2007.

* cited by examiner

METHOD AND APPARATUS FOR MANAGING IMBALANCE IN A COMMUNICATION SYSTEM

CROSS REFERENCE

This application claims priority from U.S. application No. 60/329,772, filed Oct. 15, 2001, entitled "Method and Apparatus for Forward Link Control of Mis-Matched Forward and Reverse Links" and is assigned to the assignee of the present invention.

BACKGROUND OF THE INVENTION

I. Related Field

Disclosed embodiments of the present invention relate generally to communication systems, and more specifically to a method and an apparatus for managing imbalance in a wireless communication system.

II. Background

Communication systems have been developed to allow transmission of information signals from an origination station to a physically distinct destination station. In transmitting information signal from the origination station over a communication channel, the information signal is first converted into a form suitable for efficient transmission over the communication channel. Conversion, or modulation, of the information signal involves varying a parameter of a carrier wave in accordance with the information signal in such a way that the spectrum of the resulting modulated carrier is confined within the communication channel bandwidth. At the destination station the original information signal is replicated from the modulated carrier wave received over the communication channel. Such a replication is generally achieved by using an inverse of the modulation process employed by the origination station.

Modulation also facilitates multiple-access, i.e., simultaneous transmission and/or reception, of several signals over a common communication channel. Multiple-access communication systems often include a plurality of remote subscriber units requiring intermittent service of relatively short duration rather than continuous access to the common communication channel. Several multiple-access techniques are known in the art, such as time division multiple-access (TDMA), frequency division multiple-access (FDMA), and amplitude modulation multiple-access (AM). Another type of a multiple-access technique is a code division multiple-access (CDMA) spread spectrum system that conforms to the "TIA/EIA/IS-95 Remote station-Base Station Compatibility Standard for Dual-Mode Wide-Band Spread Spectrum Cellular System," hereinafter referred to as the IS-95 standard. The use of CDMA techniques in a multiple-access communication system is disclosed in U.S. Pat. No. 4,901,307, entitled "SPREAD SPECTRUM MULTIPLE-ACCESS COMMUNICATION SYSTEM USING SATELLITE OR TERRESTRIAL REPEATERS," and U.S. Pat. No. 5,103,459, entitled "SYSTEM AND METHOD FOR GENERATING WAVEFORMS IN A CDMA CELLULAR TELEPHONE SYSTEM," both assigned to the assignee of the present invention.

A multiple-access communication system may be a wireless or wire-line and may carry voice and/or data. An example of a communication system carrying both voice and data is a system in accordance with the IS-95 standard, which specifies transmitting voice and data over the communication channel. A method for transmitting data in code channel frames of fixed size is described in detail in U.S. Pat. No. 5,504,773, entitled "METHOD AND APPARATUS FOR THE FORMATTING OF DATA FOR TRANSMISSION", assigned to the assignee of the present invention. In accordance with the IS-95 standard, the data or voice is partitioned into code channel frames that are 20 milliseconds wide with data rates as high as 14.4 Kbps. Additional examples of a communication systems carrying both voice and data comprise communication systems conforming to the "3rd Generation Partnership Project" (3GPP), embodied in a set of documents including Document Nos. 3G TS 25.211, 3G TS 25.212, 3G TS 25.213, and 3G TS 25.214 (the W-CDMA standard), or "TR-45.5 Physical Layer Standard for cdma2000 Spread Spectrum Systems" (the IS-2000 standard).

In a multiple-access communication system, communications between users are conducted through one or more base stations. A first user on one subscriber station communicates to a second user on a second subscriber station by transmitting data on a reverse link to a base station. The base station receives the data and can route the data to another base station. The data is transmitted on a forward link of the same base station, or the other base station, to the second subscriber station. The forward link refers to transmission from a base station to a subscriber station and the reverse link refers to transmission from a subscriber station to a base station. Likewise, the communication can be conducted between a first user on one mobile subscriber station and a second user on a landline station. A base station receives the data from the user on a reverse link, and routes the data through a public switched telephone network (PSTN) to the second user. In many communication systems, e.g., IS-95, W-CDMA, IS-2000, the forward link and the reverse link are allocated separate frequencies.

An example of a data only communication system is a high data rate (HDR) communication system that conforms to the TIA/EIA/IS-856 industry standard, hereinafter referred to as the IS-856 standard. This system in accordance with the IS-856 standard is based on a communication system disclosed in co-pending application Ser. No. 08/963,386, entitled "METHOD AND APPARATUS FOR HIGH RATE PACKET DATA TRANSMISSION," filed Nov. 3, 1997, assigned to the assignee of the present invention. The communication system in accordance with the IS-856 standard defines a set of data rates, ranging from 38.4 kbps to 2.4 Mbps, at which an access point (access point) may send data to a subscriber station (access terminal). Because the access point is analogous to a base station, the terminology with respect to cells and sectors is the same as with respect to voice systems.

A significant difference between voice services and data services is the fact that the former imposes stringent and fixed delay requirements. Typically, the overall one-way delay of speech frames must be less than 100 ms. In contrast, the data delay can become a variable parameter used to optimize the efficiency of the data communication system. Specifically, more efficient error correcting coding techniques which require significantly larger delays than those that can be tolerated by voice services can be utilized. An exemplary efficient coding scheme for data is disclosed in U.S. patent application Ser. No. 08/743,688, entitled "SOFT DECISION OUTPUT DECODER FOR DECODING CONVOLUTIONALLY ENCODED CODEWORDS", filed Nov. 6, 1996, assigned to the assignee of the present invention.

Another significant difference between voice services and data services is that the former requires a fixed and common grade of service (GOS) for all users. Typically, for digital systems providing voice services, this translates into a fixed and equal transmission rate for all users and a maximum tolerable value for the error rates of the speech frames. In contrast, for data services, the GOS can be different from user to user and can be a parameter optimized to increase the overall efficiency of the data communication system. The GOS of a data communication system is typically defined as the total delay incurred in the transfer of a pre-determined amount of data, hereinafter referred to as a data packet.

Yet another significant difference between voice services and data services is that the former requires a reliable communication link. When a remote station, communicating with a first base station, moves to the edge of the associated cell or sector, the remote station initiates a simultaneous communication with a second base station. This simultaneous communication, when the remote station receives a signal carrying equivalent information from two base stations, termed soft hand-off, is a process of establishing a communication link with the second base station while maintaining a communication link with the first base station. When the remote station eventually leaves the cell or sector associated with the first base station, and breaks the communication link with the first base station, it continues the communication on the communication link established with the second base station. Because the soft hand-off is a "make before break" mechanism, the soft-handoff minimizes the probability of dropped calls. The method and system for providing a communication with a remote station through more than one base station during the soft hand-off process are disclosed in U.S. Pat. No. 5,267,261, entitled "MOBILE ASSISTED SOFT HAND-OFF IN A CDMA CELLULAR TELEPHONE SYSTEM," assigned to the assignee of the present invention. Softer hand-off is the process whereby the communication occurs over multiple sectors that are serviced by the same base station. The process of softer hand-off is described in detail in co-pending U.S. patent application Ser. No. 08/763,498, entitled "METHOD AND APPARATUS FOR PERFORMING HAND-OFF BETWEEN SECTORS OF A COMMON BASE STATION", filed Dec. 11, 1996, assigned to the assignee of the present invention. Thus, both soft and softer hand-off for voice services result in redundant transmissions from two or more base stations to improve reliability.

This additional reliability is not required for data transmission because the data packets received in error can be retransmitted. For data services, the parameters, which measure the quality and effectiveness of a data communication system, are the transmission delay required to transfer a data packet and the average throughput rate of the system. Transmission delay does not have the same impact in data communication as in voice communication, but the transmission delay is an important metric for measuring the quality of the data communication system. The average throughput rate is a measure of the efficiency of the data transmission capability of the communication system. Consequently, the transmit power and resources used to support soft hand-off can be more efficiently used for transmission of additional data. To maximize the throughput, the transmitting sector should be selected in a way that maximizes the forward link throughput as perceived by the access terminal.

In a wireless communications system, a mis-match between forward and reverse links, also known as an imbalance, may occur between a forward link and a reverse link. Imbalance occurs when a forward link quality metric of a first sector is greater than the forward link quality metric of a second sector as measured at an access terminal, and a quality metric of the access terminal's reverse link as measured at the first sector is less than a quality metric as measured at the second sector. As will be explained below, performance of a communication system may be negatively affected by an imbalance between a forward link and a reverse link. There is, therefore, a need in the art for a method and an apparatus for managing such an imbalance.

SUMMARY OF THE INVENTION

Broadly, embodiments disclosed herein address the above stated needs by receiving a reverse link information on at least one non-serving sector; and mitigating imbalance utilizing said received reverse link information.

In another embodiment the above stated needs are addressed by measuring reverse link quality metric at each sector; declaring an imbalance when a reverse link quality metric measured at a serving sector is less than a reverse link quality metric measured at least one non-serving sector; and mitigating said imbalance.

DETAILED DESCRIPTION

Definitions

Figure 1:
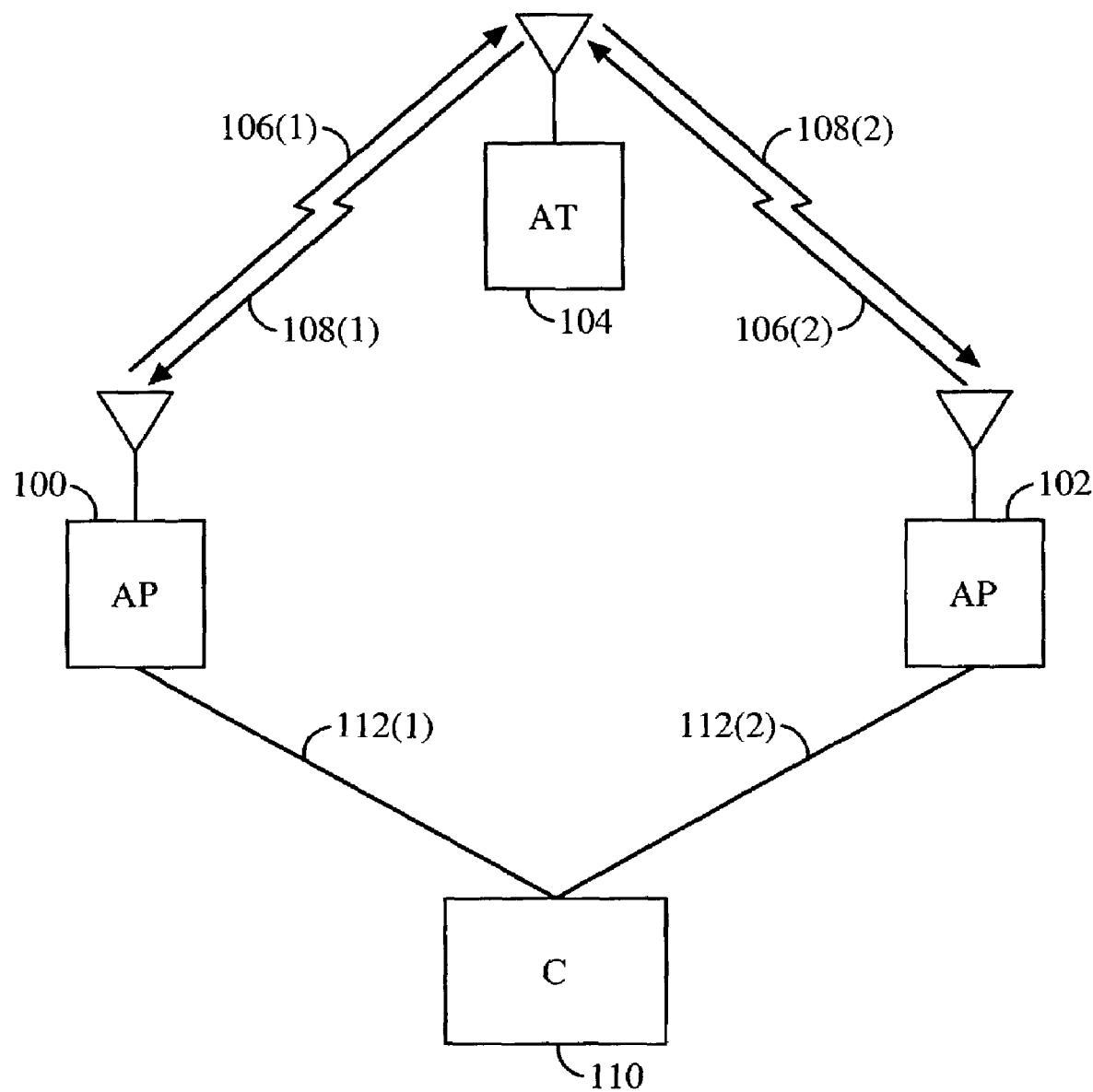
FIG. 1 illustrates a conceptual diagram of a communication system capable of performing re-pointing in accordance with embodiments of the present invention, e.g., a communication system in accordance with the IS-856 standard.

The word "exemplary" is used exclusively herein to mean "serving as an example, instance, or illustration." Although a best mode embodiment is contained herein, an embodiment described as "exemplary" is not necessarily to be construed as preferred or advantageous over other embodiments.

The term packet is used exclusively herein to mean a group of bits, including data (payload) and control elements, arranged into a specific format. The control elements comprise, e.g., a preamble, a quality metric, and others known to one skilled in the art. Quality metric comprises, e.g., a cyclical redundancy check (CRC), a parity bit, and others known to one skilled in the art.

The term access network is used exclusively herein to mean a collection of access points (access point) and one or more access point controllers. The access network transports data packets between multiple access terminals (access terminal). The access network may be further connected to additional networks outside the access network, such as a corporate Intranet or the Internet, and may transport data packets between each access terminal and such outside networks.

The term base station, referred to herein as an access point in the case of a communication system in accordance with the IS-856 standard, is used exclusively herein to mean the hardware with which subscriber stations communicate. Cell refers to the hardware or a geographic coverage area, depending on the context in which the term is used. A sector is a partition of a cell. Because a sector has the attributes of a cell, the teachings described in terms of cells are readily extended to sectors.

The term subscriber station, referred to herein as an access terminal in the case of a communication system in accordance with the IS-856 standard, is used herein to mean the hardware with which an access network communicates. An access terminal may be mobile or stationary. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. An access terminal that is in the process of establishing an active traffic channel connection with an access point is said to be in a connection setup state. An access terminal that has established an active traffic channel connection with an access point is called an active access terminal, and is said to be in a traffic state.

The term communication channel/link is as used herein to mean a single route over which a signal is transmitted described in terms of modulation characteristics and coding, or a single route within the protocol layers of either the access point or the access terminal.

The term reverse channel/link is as used herein means a communication channel/link through which the access terminal sends signals to the access point.

A forward channel/link is as used herein to mean a communication channel/link through which an access point sends signals to an access terminal.

The term soft hand-off is as used herein to mean a communication between a subscriber station and two or more sectors, wherein each sector belongs to a different cell. In the context of IS-95 standard, the reverse link communication is received by both sectors, and the forward link communication is simultaneously carried on the two or more sectors' forward links. In the context of the IS-856 standard, data transmission on the forward link is non-simultaneously carried out between one of the two or more sectors and the access terminal.

The term softer hand-off is as used herein to mean a communication between a subscriber station and two or more sectors, wherein each sector belongs to the same cell. In the context of the IS-95 standard, the reverse link communication is received by both sectors, and the forward link communication is simultaneously carried on one of the two or more sectors' forward links. In the context of the IS-856 standard, data transmission on the forward link is non-simultaneously carried out between one of the two or more sectors and the access terminal.

The term re-pointing is as used herein to mean a selection of a sector that is a member of access terminal's active list, wherein the sector is different than a currently selected sector.

The term serving sector is as used herein to mean a sector that a particular access terminal selected for data communication or a sector that is communicating data to the particular access terminal.

The term erasure is as used herein to mean failure to recognize a message.

Description

FIG. 1 illustrates a conceptual diagram of a communication system capable of performing re-pointing in accordance with embodiments of the present invention, e.g., a communication system in accordance with the IS-856 standard. One skilled in the art understands that a communication system in accordance with the IS-856 standard is used for pedagogical purposes only, and the teaching is equally applicable to other communications systems, in which a remote station is served by a sector with the highest forward link quality metric, e.g., a communication system in accordance with Revision C of IS-2000, High Speed Downlink Packed Access (HSDPA) communication system, and other systems known to one of ordinary skills in the art. Such HSDPA is disclosed in documents numbers 3GPP TS 25.211, 25.212, 25.213 and 25.214.

An access point 100 transmits data to an access terminal 104 over a forward link 106(1), and receives data from the access terminal 104 over a reverse link 108(1). Similarly, an access point 102 transmits data to the access terminal 104 over a forward link 106(2), and receives data from the access terminal 104 over a reverse link 108(2). In accordance with one embodiment, data transmission on the forward link occurs from one access point to one access terminal at or near the maximum data rate that can be supported by the forward link and the communication system. Other channels of the forward link, e.g., control channel, may be transmitted from multiple access point's to one access terminal. Reverse link data communication may occur from one access terminal to one or more access point's. The access point 100 and the access point 102 are connected to an access point controller 110 over backhauls 112(1) and 112(2). The access point controller may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The term backhaul is used to mean a communication link between a controller and an access point. Although only two access terminal's and one access point are shown in FIG. 1, one of ordinary skill in the art recognizes that this is for pedagogical purposes only, and the communication system can comprise plurality of access terminal's and access point's.

Initially, the access terminal 104 and one of the access point's, e.g., the access point 100, establish a communication link using a pre-determined access procedure. In this connected state, the access terminal 104 is able to receive data and control messages from the access point 100, and is able to transmit data and control messages to the access point 100. The access terminal 104 continually searches for other access point's that could be added to the access terminal 104 active set. The active set comprises a list of the access point's capable of communication with the access terminal 104. When such an access point is found, the access terminal 104 calculates a quality metric of the access point's forward link, which in accordance with one embodiment comprises a signal-to-interference and-noise ratio (SINR). In accordance with one embodiment, the access terminal 104 searches for other access points and determines the access point's SINR in accordance with a pilot signal. Simultaneously, the access terminal 104 calculates the forward link quality metric for each access point in the access terminal 104 active set. If the forward link quality metric from a particular access point is above a pre-determined add threshold or below a pre-determined drop threshold for a predetermined period of time, the access terminal 104 reports this information to the access point 100. Subsequent messages from the access point 100 direct the access terminal 104 to add to or to delete from the access terminal 104 active set the particular access point.

The access terminal 104 selects a serving access point from the active set based on a set of parameters. The set of parameters can comprise present and previous SINR measurements, a bit-error-rate and/or a packet-error-rate, and other parameters known to one skilled in the art. In accordance with one embodiment, the serving access point is selected in accordance with the largest SINR measurement. The access terminal 104 then transmits to the selected access point a data request message (DRC message) on the data request channel (DRC channel). The DRC message can contain the requested data rate or, alternatively, an indication of the quality of the forward link, e.g., the measured SINR, the bit-error-rate, or the packet-error-rate. In accordance with one embodiment, the access terminal 104 can direct the transmission of the DRC message to a specific access point by the use of a Walsh code, which uniquely identifies the specific access point. The DRC message symbols are exclusively OR'ed (XOR) with the unique Walsh code. The XOR operation is referred to as Walsh covering of a signal. Since each access point in the active set of the access terminal 104 is identified by a unique Walsh code, only the selected access point which performs the identical XOR operation as that performed by the access terminal 104 with the correct Walsh code can correctly decode the DRC message.

The data to be transmitted to the access terminal 104 arrive at the access point controller 110. In accordance with one embodiment, the access point controller 110 sends the data to all access points in access terminal 104 active set over the backhaul 112. In another embodiment, the access point controller 110 first determines, which access point was selected by the access terminal 104 as the serving access point, and then sends the data to the serving access point. The data are stored in a queue at the access point(s). A paging message is then sent by one or more access points to the access terminal 104 on respective control channels. The access terminal 104 demodulates and decodes the signals on one or more control channels to obtain the paging messages.

At each time time-slot, the access point can schedule data transmission to any of the access terminals that received the paging message. An exemplary method for scheduling transmission is described in U.S. Pat. No. 6,229,795, entitled "SYSTEM FOR ALLOCATING RESOURCES IN A COMMUNICATION SYSTEM," assigned to the assignee of the present invention. The access point uses the rate control information received from each access terminal in the DRC message to efficiently transmit forward link data at the highest possible rate. In accordance with one embodiment, the access point determines the data rate at which to transmit the data to the access terminal 104 based on the most recent value of the DRC message received from the access terminal 104. Additionally, the access point uniquely identifies a transmission to the access terminal 104 by using a spreading code which is unique to that remote station. In the exemplary embodiment, this spreading code is the long pseudo noise (PN) code, which is defined by the IS-856 standard.

The access terminal 104, for which the data packet is intended, receives the data transmission and decodes the data packet. In accordance with one embodiment, each data packet is associated with an identifier, e.g. a sequence number, which is used by the access terminal 104 to detect either missed or duplicate transmissions. In such an event, the access terminal 104 communicates via the reverse link data channel the sequence numbers of the missing data units. The access point controller 110, which receives the data messages from the access terminal 104 via the access point communicating with the access terminal 104, then indicates to the access point what data units were not received by the access terminal 104. The access point then schedules a retransmission of such data units.

When the communication link between the access terminal 104 and the access point 100, operating in the variable rate mode, deteriorates below required reliability level, the access terminal 104 first attempts to determine whether communication with another access point in the variable rate mode supporting an acceptable rate data is possible. If the access terminal 104 ascertains such an access point (e.g., the access point 102), a re-pointing to the access point 102, therefore, to a different communication link occurs, and the data transmissions continue from the access point 102 in the variable rate mode. The above-mentioned deterioration of the communication link can be caused by, e.g., the access terminal 104 moving from a coverage area of the access point 100 to the coverage area of the access point 102, shadowing, fading, and other reasons known to one skilled in the art. Alternatively, when a communication link between the access terminal 104 and another access point (e.g., the access point 102) that may achieve higher throughput rate that the currently used communication link becomes available, a re-pointing to the access point 102, therefore, to a different communication link occurs, and the data transmissions continue from the access point 102 in the variable rate mode.

One skilled in the art recognizes that an access point can comprise one or more sectors. In the description above, the term access point was used generically to allow clear explanation of basic concepts of the communication system illustrates a conceptual diagram of a communication system capable of performing re-pointing in accordance with embodiments of the present invention, e.g., a communication system in accordance with the IS-856 standard. However, One of ordinarily skilled in the art can extend the explained concepts to access point comprising any number of sectors. Consequently, the concept of sector will be used throughout the rest of the document. One of ordinary skills in the art further recognizes that an access point (or a sector) may further comprise a control entity controlling functions of the access point (or the sector). Such a control entity is called hereinafter collectively called sector controller. The sector controller may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Forward Link Structure

Figure 2:
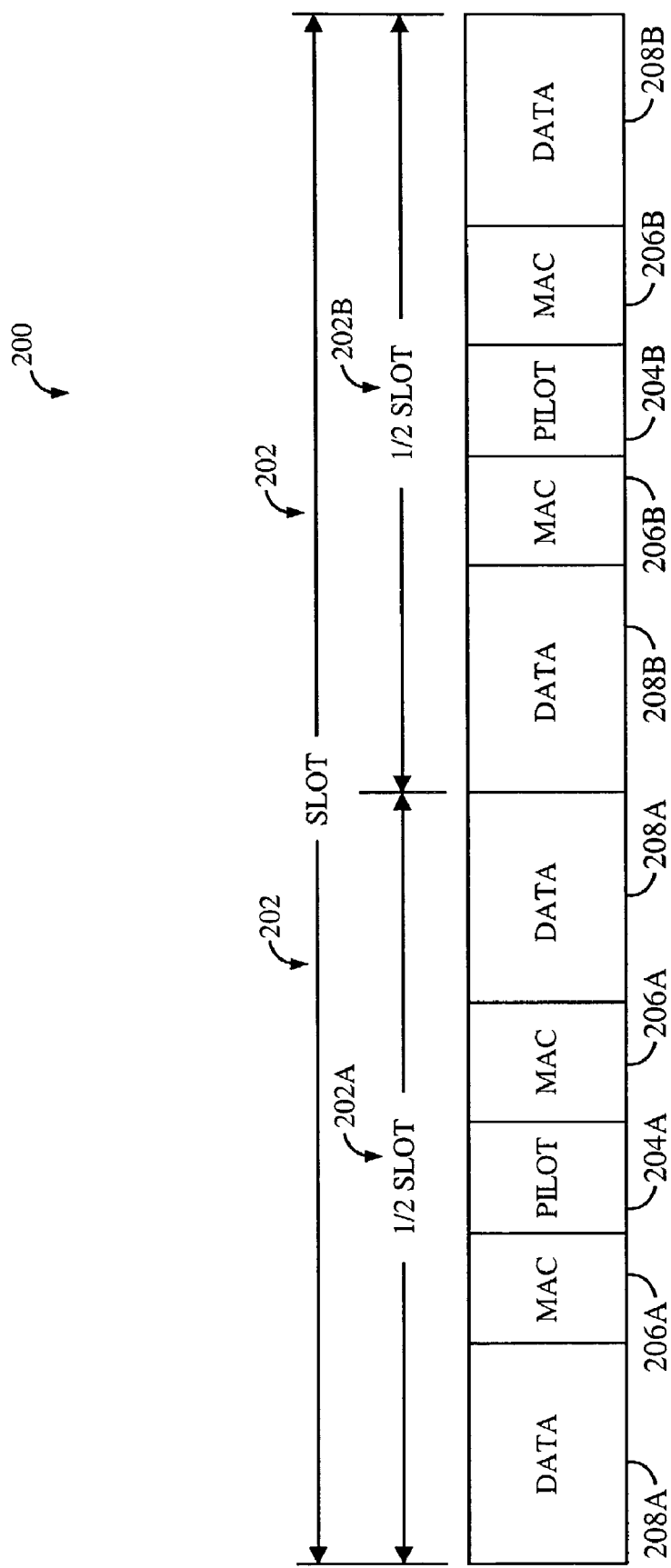
FIG. 2 illustrates an exemplary forward link waveform.

FIG. 2 illustrates an exemplary forward link waveform 200. For pedagogical reasons, the waveform 200 is modeled after a forward link waveform of the above-mentioned communication system in accordance with the IS-856 standard. However, one of ordinary skill in the art will understand that the teaching is applicable to different waveforms. Thus, for example, in accordance with one embodiment, the waveform does not need to contain pilot signal bursts, and the pilot signal can be transmitted on a separate channel, which can be continuous or bursty. The forward link 200 is defined in terms of frames. A frame is a structure comprising 16 time-slots 202; each time-slot 202 being 2048 chips long, corresponding to 1.66 ms. time-slot duration, and, consequently, 26.66 ms. frame duration. Each time-slot 202 is divided into two half-time-slots 202a, 202b, with pilot bursts 204a, 204b transmitted within each half-time-slot 202a, 202b. In the exemplary embodiment, each pilot burst 204a, 204b is 96 chips long, and is centered at the mid-point of its associated half-time-slot 202a, 202b. The pilot bursts 204a, 204b comprise a pilot channel signal covered by a Walsh cover with index 0. A forward medium access control channel (MAC) 206 forms two bursts, which are transmitted immediately before and immediately after the pilot burst 204 of each half-time-slot 202. In the exemplary embodiment, the MAC is composed of up to 64 code channels, which are orthogonally covered by 64-ary Walsh codes. Each code channel is identified by a MAC index, which has a value between 1 and 64, and identifies a unique 64-ary Walsh cover. One of the available MAC indices between 5 and 63 is used for reverse link power control (RLPC) for each subscriber station. The reverse link power control is modulated on a reverse power control channel (RPC). MAC index 4 is used for a reverse activity channel (RA), which performs load control on the reverse traffic channel. The forward link traffic channel and control channel payload is sent in the remaining portions 208a of the first half-time-slot 202a and the remaining portions 208b of the second half-time-slot 202b.

As discussed, the RPC channel is used to send the power control commands, which are used to control the transmit power of the reverse link transmission from an access terminal. Power control is critical on the reverse link because the transmit power of each access terminal is an interference to other access terminals in the communication system. To minimize interference on the reverse link and maximize capacity, the transmit power of each access terminal is controlled by two power control loops. In one embodiment, the power control loops are similar to that of the CDMA system disclosed in detail in U.S. Pat. No. 5,056,109, entitled "METHOD AND APPARATUS FOR CONTROLLING TRANSMISSION POWER IN A CDMA CELLULAR MOBILE TELEPHONE SYSTEM", assigned to the assignee of the present invention and incorporated by reference herein. Other power control mechanism can also be contemplated and are within the scope of the present invention.

The first (outer) power control loop sets a level at which a reverse link quality metric is to be maintained. The signal quality is measured, e.g., as the energy-per-chip-to-noise-plus-interference ratio (Ec/No+Io) of the reverse link signal received at an access point. Such a signal quality is measured e.g., on a reverse pilot channel. The set level is referred to as the (Ec/No+Io) set point. The outer power control loop adjusts the set point such that the desired level of performance, as measured, e.g., as a packet-error-rate (PER), is maintained. The second (closed) power control loop adjusts the transmit power of an access terminal such that the reverse link signal quality is maintained at the set level.

The closed loop power control for an access terminal is performed by all access points in the access terminal's Active Set. Within the closed loop, the (Ec/No+Io) of the reverse link signal is measured at each of the access point. Each access point then compares the measured (Ec/No+Io) with the set point. If the measured (Ec/No+Io) is greater than the set point, that access point transmits a power control message to access terminal to decrease the transmit power. Alternatively, if the measured (Ec/No+Io) is below the set point, that access point transmits a power control message to access terminal to increase the transmit power. In one embodiment, the power control message is implemented with one power control bit sent on the RPC channel (RPC bit). An access point transmits '0' ("up") RPC bit if the measured (Ec/No+Io) is below the set point, and '1' ("down") RPC bit if the measured (Ec/No+Io) is greater than the set point. The access terminal adjusts the access terminal's output power by increasing an output power if the RPC bits received from all controlling access points are '0' ("up"). If any RPC bit received from the controlling access points is '1' ("down"), the access terminal decreases the output power.

As discussed, in a wireless communications system, e.g., a wireless communications system in accordance with FIG. 1, an imbalance may occur between a forward link and a reverse link. It has been observed that low levels of imbalance, e.g., less than 1 dB are almost always present in a communication system. This level of imbalance appears to have little impact either on the forward link requested/served rate or on the DRC erasure rate on the reverse link. As used herein the term DRC erasure rate indicates a percentage of DRC messages that where erased at the access point. Consequently, such an imbalance is accepted because the cost, e.g., outage associated with repointing DRC's in a dynamic communication system environment (changing channel conditions, access terminal mobility), far exceeds the small penalty in forward link sector throughput that may result.

As the imbalance increases, the sector with the better forward link quality metric has a higher DRC erasure rate, due to worse reverse link quality metric. Consequently, the advantage of an access terminal pointing it's DRC to a sector with a better forward link quality metric is reduced because the DRC erasure rate at the sector with the better forward link quality metric may be so large as to reduce the forward link throughput significantly. In an extreme case, if the DRC erasure rate is 100%, regardless of the forward link quality metric, the access terminal is not served. On the other hand, re-pointing the access terminal's DRC to a sector with a better reverse link quality metric may not improve the forward link throughput because the sector's forward link quality metric is reduced.

To remedy the performance degradation caused by imbalance, in one embodiment, all sectors that receive and recovering the information communicated from the remote station over a reverse link relay the information to a control entity, responsible for determining whether the information was received by the serving sector. The term recovering is used herein to mean any processing, e.g., decoding, detecting utilized to obtain the information modulated on the reverse link. The information may comprise e.g., signaling information, system information, user data information, and any other information modulated on the reverse link. The control entity may comprise, e.g., a access point controller, a sector controller, or any other controller known to one skilled in the art. The control entity may be remote from sector(s) or co-located with sector(s). The control entity may utilize the information thusly obtained in the same manner as if the information were obtained from the serving sector. If the information is to be communicated from the sectors that received the information to a control entity not co-located with the receiving sector(s), the backhaul traffic load increases. In order to reduce such a backhaul traffic load, the receiving sector(s) may employ methods to avoid reporting each instance of the received information. For example, the sector(s) process the value of the signal to noise and interference ratio of the received and recovered information over a time window. The sector(s) then report a value representative of the information processed over a time window, e.g., a mean, a maximum, a minimum, or other or a combination thereof. However, one of ordinary skill in the arts understands that the above-disclosed method is exemplary only, and other methods achieving the above-stated objective are contemplated.

Alternatively, the non-serving sectors that receive and recover the information communicated from the remote station over a reverse link do not send the recovered information, but an indication that the information was received and recovered. When the serving sector fails to receive the reverse link information, the serving sector may then request the information from one or all the non-serving sectors. Thus, the backhaul traffic load is reduced. Alternatively, the non-serving sectors may abstain form receiving and recovering the information communicated from the remote station over a reverse link. Instead, the non-serving sectors measure or estimate the remote station's reverse link quality metric. The quality metric may comprise, e.g., frame erasure rate (FER), reverse link pilot channel signal-to-noise and interference ratio, number of sector's rake receiver's fingers locked on the reverse link signal, and other reverse link quality metric. The non-serving sectors then send the quality metric. When the serving sector fails to receive the reverse link information, the serving sector may then request that the non-serving sector(s), which reported good reverse link quality metric start recoverding and sending the information.

Additionally, the control entity may utilize the information obtained form the receiving sectors, as an indication that an imbalance exists. Specifically, if the control entity receives the information communicated only through a source that is not the serving sector, the control entity declares an imbalance. To prevent false imbalance detection, the control entity may declare an imbalance when, e.g., a number of occurrences of control entity receiving the information communicated only through a source that is not the serving sector during a time window exceeds a threshold. Alternatively, the sum of number of occurrences of control entity receiving the information communicated only through a source that is not the serving sector and the number of occurrences of control entity not receiving the information communicated through a source that is the serving sector during a time window exceeds a threshold. Such a threshold is determined in accordance with desired performance criteria of a communication system, e.g., latency, throughput, and other criteria known to one of ordinary skill in the art. When an imbalance is detected, the control entity utilizes measures described.

In another embodiment, the control entity determines an imbalance of a remote station in accordance with the remote station's reverse link quality metric reported by sectors. The control entity declares an imbalance when the reverse link quality metric reported by the serving sector is lower than a reverse link reported by the non-serving sector(s). Note that such scenario includes an event when the control entity fails to receive the reverse link quality metric from the serving sector due to failure of the serving sector reverse link. To prevent false imbalance detection, the control entity may further employ methods of process the received reverse link information before making the imbalance decision. Such processing may comprise, e.g., requiring that the reverse link quality metric reported by the serving sector is lower than a reverse link reported by a non-serving sector for a determined time interval; requiring that the reverse link quality metric reported by the serving sector is lower than a reverse link reported by a non-serving sector by a determined value, or a combination thereof. However, one of ordinary skill in the arts understands that the above-disclosed methods are exemplary only, and other methods achieving the above-stated objective are contemplated. Alternatively, the only quality metric considered is the quality metric reported by the access points containing sectors belonging to the Active Set for the remote station.

Remedial Measures

Once the control entity determines imbalance, remedial measures may be undertaken. In one embodiment, the control entity instructs the serving sector to communicate to the remote station a message instructing the remote station to remove the sector(s) with unreliable or lost reverse link from the remote station's Active Set. This will result in the remote station re-pointing to a different serving sector.

In another embodiment, the control entity utilizes the reverse link quality metrics reported by the sectors to decide how much more reverse link power the serving sector requires relative to the reverse link power provided by current setting of reverse link power control to achieve target reverse link quality metric at the serving sector. In one embodiment, the target reverse link power is equal to the reverse link power as perceived by the non-serving sector with the highest reverse link quality metric. As explained above, increasing the outer loop set point forces increased reverse link power transmission. However, the closed loop power control will tend to decrease the reverse link power because the reverse link quality metric, which drives the outer loop set point, will be good. Consequently, in one embodiment, the control entity determines the reverse link quality metric, which will result in a desired increase of the reverse link power. In another embodiment, only the reverse link quality metric from the serving sector is used to determine the outer loop set point. Further details describing the above-mentioned embodiment are disclosed in a co-pending patent application Ser. No. 09/587, 668, entitled "METHOD AND APPARATUS FOR IMPROVED FORWARD LINK POWER CONTROL WHILE IN SOFT HANDOFF," filed on Jun. 5, 2000, assigned to the assignee of the present invention.

Those of ordinary skill in the art will recognize that although the various embodiments were described in terms of flowcharts and methods, such was done for pedagogical purposes only. The methods can be performed by an apparatus, which in one embodiment comprises a processor interfaced with a transmitter, a receiver and any other appropriate blocks of the access terminal and/or access point.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

What is claimed is:

1. A method for managing imbalance in a wireless communication system, comprising:
    receiving and recovering reverse link information in at least one non-serving sector to form a non-serving sector reverse link quality metric for comparison with a serving sector reverse link quality metric; and
    mitigating imbalance at a controller between quality metrics of forward and reverse links in a serving sector utilizing said non-serving sector reverse link quality metric determined from said reverse link information received and recovered over a reverse link at said at least one non-serving sector.

2. The method as claimed in claim 1 wherein said mitigating imbalance utilizing said received reverse link information comprises:
    relaying said recovered reverse link information to a control entity.

3. The method as claimed in claim 1 wherein said mitigating imbalance utilizing said received reverse link information, comprises:
    relaying indication of successful recovering to a control entity.

4. The method as claimed in claim 3 further comprising:
    relaying said recovered reverse link information to a control entity if recovering of a received reverse link information from serving sector failed.

5. A method for managing imbalance in a wireless communication system communication system, comprising:
    recovering and measuring a non-serving sector reverse link quality metric in at least one non-serving sector based on received and recovered reverse link information;
    declaring an imbalance when a serving sector reverse link quality metric measured at a serving sector is less than a non-serving sector reverse link quality metric measured in said at least one non-serving sector; and
    mitigating said imbalance at a controller between quality metrics of forward and reverse links in a serving sector utilizing said non-serving sector reverse link quality metric determined from said reverse link information received and recovered over a reverse link at said at least one non-serving sector.

6. The method as claimed in claim 5, wherein said recovering and measuring reverse link quality metric at each sector comprises:
    measuring reverse link quality metric at each sector in remote station's active set.

7. The method as claimed in claim 6, wherein said mitigating said imbalance comprises:
    instructing the subscriber station to remove said serving sector from the subscriber station's active set.

8. The method as claimed in claim 7, wherein said causing the subscriber station to increase reverse link power comprises:
    determining quality metric resulting in a desired increase of a set point.

9. The method as claimed in claim 7, wherein said causing the subscriber station to increase reverse link power comprises:
    determining the outer loop set point in accordance with only the quality metric from the serving sector.

10. The method as claimed in claim 5, wherein said mitigating said imbalance comprises:
    causing the subscriber station to increase reverse link power.

11. An apparatus for managing imbalance in a wireless communication system communication system, comprising:
    means for receiving reverse link information in at least one non-serving sector to form a non-serving sector reverse link quality metric for comparison with a serving sector reverse link quality metric; and
    means for recovering said received reverse link information and mitigating imbalance between quality metrics of forward and reverse links in a serving sector utilizing said non-serving sector reverse link quality metric determined from said reverse link information received and recovered over a reverse link at said at least one non-serving sector.

12. The apparatus as claimed in claim 11 wherein said means for mitigating imbalance utilizing said received reverse link information comprises:
    means for relaying said recovered reverse link information to a control entity.

13. The apparatus as claimed in claim 11 wherein said mitigating imbalance utilizing said received reverse link information, comprises:
    means for relaying indication of successful recovering to a control entity.

14. The apparatus as claimed in claim 13 further comprising:
    means for relaying said recovered reverse link information to a control entity if recovering of a received reverse link information from serving sector failed.

15. An apparatus for managing imbalance in a wireless communication system, comprising:
- means for recovering and measuring a non-serving sector reverse link quality metric in at least one non-serving sector based on received and recovered reverse link information;
- means for declaring an imbalance when a serving sector reverse link quality metric measured at a serving sector is less than a non-serving sector reverse link quality metric measured in said at least one non-serving sector; and
- means for mitigating said imbalance between quality metrics of forward and reverse links in a serving sector utilizing said non-serving sector reverse link quality metric determined from said reverse link information received and recovered over a reverse link at said at least one non-serving sector.

16. The apparatus as claimed in claim 15, wherein said means for recovering and measuring reverse link quality metric at each sector comprises:
- means for measuring reverse link quality metric at each sector in remote station's active set.

17. The apparatus as claimed in claim 16, wherein said means for mitigating said imbalance comprises:
- means for instructing the subscriber station to remove said serving sector from the subscriber station's active set.

18. The apparatus as claimed in claim 15, wherein said means for mitigating said imbalance comprises:
- means for causing the subscriber station to increase reverse link power.

19. The apparatus as claimed in claim 18, wherein said means for causing the subscriber station to increase reverse link power comprises:
- means for determining quality metric resulting in a desired increase of a set point.

20. The apparatus as claimed in claim 18, wherein means for causing the subscriber station to increase reverse link power comprises:
- means for determining the outer loop set point in accordance with only the quality metric from the serving sector.

21. A processor-readable medium stored a set of processor-readable instructions, the instructions executed by a processor comprising the steps of:
- receiving and recovering reverse link information in at least one non-serving sector to form a non-serving sector reverse link quality metric for comparison with a serving sector reverse link quality metric; and
- mitigating imbalance at a controller between quality metrics of forward and reverse links in a serving sector utilizing said non-serving sector reverse link quality metric determined from said reverse link information received and recovered over a reverse link at said at least one non-serving sector.

22. The processor-readable medium of claim 21 further comprising instructions for:
- relaying said recovered reverse link information to a control entity.

23. The processor-readable medium of claim 21 wherein said mitigating imbalance utilizing said received reverse link information comprises:
- relaying indication of successful recovering to a control entity.

* * * * *